May 17, 1955 H. F. LUSK 2,708,367
FORCE MEASURING INSTRUMENT
Filed April 2, 1951

INVENTOR
HILTON F. LUSK
BY *Ray Daily*
ATTORNEY

United States Patent Office 2,708,367
Patented May 17, 1955

2,708,367

FORCE MEASURING INSTRUMENT

Hilton F. Lusk, Sacramento, Calif.

Application April 2, 1951, Serial No. 218,795

5 Claims. (Cl. 73—379)

My invention relates to that class of force dynamometers in which the force may be measured remotely from its point of application, by means of hydraulic pressure transmitted through a liquid-filled connection of whatever length desired.

The object of my invention is to provide means for measuring the magnitude of an applied force with a high degree of precision in the lower range where small forces are involved and to provide ruggedness and less sensitivity in the higher range where large forces are involved. This is particularly an advantage when measuring the forces developed by muscle groups of the human or other animal bodies as in the measurement of the strength of the grip of the hand or of the force exerted by the foot, leg, arm, neck or other termination of a muscle group. In the case of an injured or asthenic muscle group, the capacity for exerting force is limited to small values. It is, therefore, essential that a means be provided which will measure these small forces in a precise manner and which will feel soft and yielding in its action to the patient applying the force. The means provided is also required to be rugged and capable of measuring the large forces developed by the muscle groups of the fully healed and strong patients. My invention accomplishes this objective. It is understood that my invention is not limited in its application to the measurement of force developed by muscle groups or by grip but it is applicable to the measurement of any type of force however applied.

To these ends my invention consists in certain novel features which I will now describe and will then particularly point out in the claims.

Figure 1:
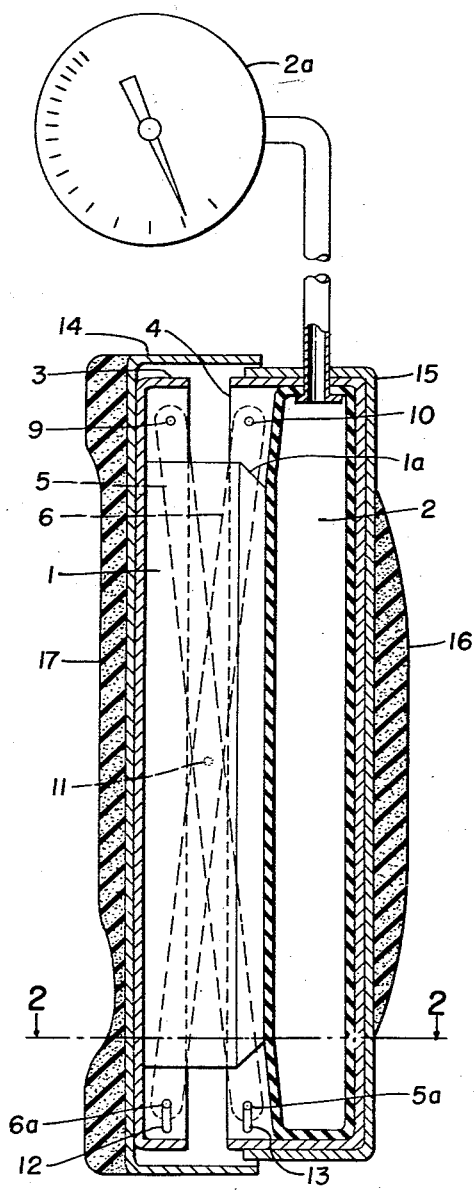
Figure 3:
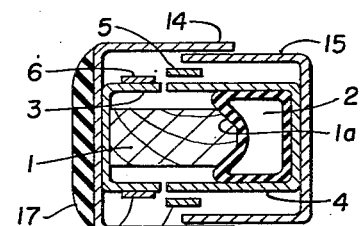
Figure 2:
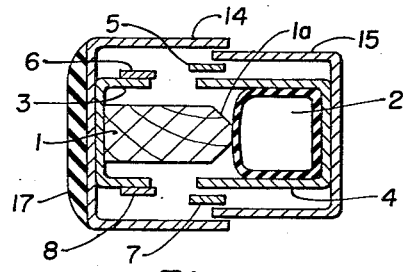

In the accompanying drawings, Figure 1 is a side view in cross-section, of an apparatus embodying my invention in one form. Figure 2 is an end view in cross-section of the same taken on line 2—2 of Figure 1, and Figure 3 is an end view in cross-section of the apparatus in compressed position as in response to an applied force.

In a dynamometer of the character to which this invention relates, the applied force is exerted against a platen which presses upon a liquid-filled flexible pressure bulb which may be elastic or non-elastic as desired. The pressure developed in the pressure bulb is transmitted by hydraulic action to the pressure gage. The readings of the pressure gage are calibrated in force units for measurement of the force applied to the platen. The pressure gage may be of a recording or of an indicating type.

In the accompanying drawings I have shown an apparatus embodying my invention in one form. In this illustrative embodiment the machine is shown as comprising two essentially elongated and parallel units, the platen 1 and the pressure bulb 2 connected to the pressure gage 2a, and this construction I prefer, although my invention may be embodied in a structure in which the platen is fully free and may be applied at any angle to the pressure bulb.

Before proceeding to describe the fundamental theory of operation of my invention I will first describe the preferred mode of construction of the force dynamometer.

The platen 1 made of wood or other suitable material is attached to the platen cap 3 made of metal or other suitable material. The pressure bulb 2 made of rubberized fabric or other suitable material is filled with water or other suitable liquid and is connected by a liquid-filled connection to the force gage 2a which may be any pressure gage of suitable range and having calibrations appropriate to the forces to be measured by the force dynamometer. The preferred form is of a recording type or of an indicating type having a reset hand which will indicate the maximum force applied at any one application. The pressure bulb 2 is supported within a pressure bulb carrier 4 made of metal or other suitable material which restricts the movement of the bulb excepting on that side which is in contact with platen 1. In this preferred form, the platen 1 is maintained in parallel relationship with the pressure bulb 2 by means of a linkage arrangement of two crossed linkage members 5 and 6 made of metal or other suitable material both placed on one side of the platen-bulb combination and a corresponding pair of crossed linkage members 7 and 8 made of metal or other suitable material on the opposite side of that combination. One end of the linkage member 5 is attached near one end of the platen cap 3 with a pivoting pin 9 made of metal or other suitable material. The corresponding end of the linkage member 6 is similarly attached near one end of the bulb carrier 4 with the pivoting pin 10. The linkage members 5 and 6 are pivotally joined at their centers with pivot pin 11 made of metal or other suitable material around which they are free to rotate in one plane. The pins 5a and 6a made of metal or other suitable material, fixed in the opposite ends of the linkage members 5 and 6 are free to slide in slots 12 and 13 located near the ends of the platen cap 3 and the bulb carrier 4 respectively. These slots are parallel to the axis of platen 1 and to the axis of bulb carrier 4 thus limiting the platen to a motion which will be continuously parallel to itself. This device to maintain the platen parallel to the bulb carrier is presented as an important but not an essential part of my invention although it is the preferred form. As previously mentioned it is not essential to the successful application of my invention, that the parallel relationship be maintained between the platen 1 and the pressure bulb 2. The invention is equally applicable to a construction with a fully free platen applied against the pressure bulb, it being necessary to employ a platen of such shape that the same area of contact be retained for any particular value of force measurement in order to retain the calibration of the force gage. The platen 1, pressure bulb 2, platen cap 3, pressure bulb carrier 4 together with the parallel motion linkage system, are contained within the telescoping cases 14 and 15 both made of metal or other suitable material, which do not touch each other and are thus friction free to avoid introduction of friction error in the measurement of the applied force. They serve as covers for the mechanism and as base units to which adapters may be attached. The form of embodiment of my invention here presented shows an adapter 16 made of sponge rubber or other suitable material attached to case 15 and designed to be suitable for application of the palm of the hand in holding in equilibrium the force applied to the platen cap 3. Adapter 17 made of sponge rubber or other suitable material is shown attached to case 14 and is designed to be suitable for application of the force to be measured, by the fingers of the hand as in a grip dynamometer. Suitable adapters can be attached to cases 14 and 15 whereby the force exerted by the foot, leg, arm, neck or other termination of a muscle group may be measured, making this instrument a myo or muscle dynamometer.

The fundamental theory of operation of my invention can be described in terms of the operating principles involved in the components described in the above preferred mode of construction. The force applied to the case 14 through any of the adapters such as adapter 17 is carried through the platen cap 3 to the platen 1 and is applied to the presure bulb 2 distributed uniformly over the area of contact between the platen and the pressure bulb. The pressure developed in the pressure bulb 2 will be equal to the magnitude of the applied force divided by the area of contact. By making the area of contact a small value the unit pressure is made relatively large even though the total force is small. This is the theory supporting the particular shape of the platen whereby it is tapered in profile as shown at 1a. As greater force is applied the area of contact is increased. The unit pressure will not therefore increase in direct proportion to the total force but will increase exponentially with the total force and the exponent will be less than one or unity so long as the area of contact continues to increase. This characteristic of my invention permits a high degree of precision in measuring small forces. As the total force is increased the area of contact between the platen 1 and the pressure bulb 2 increases, therefore the intensity of the force and hence the pressure will not increase as fast as does the magnitude of the applied force. Hence large forces will be measured with a lower degree of precision than that maintained for small forces. This permits a more open scale on the force gage in the low force range and a less open scale in the large force range as indicated in 2a of Figure 1. By proper shaping of the platen 1 it is practical to obtain any reasonable arrangement of the scale on the force gage. The preferred form showing a tapered platen is here presented. A straight sided platen or a flat plate platen will operate successfully. Because of the pulling in of the pressure bulb as movement of the platen takes place, particularly in a fully non-elastic pressure bulb, the action will in effect increase the effective area of contact as the force is increased and the bulb is pressed inward as shown in Figure 3. This effect will not be as great as in the case of the tapered platen. The construction with a tapered platen I prefer, but my invention may be embodied in a structure in which the platen is not tapered or in which the platen may consist of a simple flat plate or of a ball shaped end in contact with the pressure bulb. This latter construction is recommended when a fully free platen is to be employed in applying my invention. The combination of platen, pressure bulb and pressure gage provides a secondary type of measuring instrument requiring calibrations throughout its operating range. With pressure bulbs having the same strength and resistence characteristics and with pressure gages having the same volume displacement and elastic characteristics, a single calibration can be applied to all dials and the units are interchangeable.

Having thus fully described my invention, what I claim as new, and desire to secure by Letters Patent, is:

1. A myodynamometer comprising a rigid container substantially closed on all sides but one, a flexible bulb having walls disposed within and conforming to the contour of said container except on said one side, the wall of said bulb on said one side being inwardly deformable while maintaining substantially uniform wall thickness, a pressure gage, means for connecting said bulb and said gage in a closed hydraulic system, a platen cap, means for mounting said platen cap on said container for movement toward and away from said one side, and a rigid platen on said cap in contact with said bulb, said platen having a contour cross-section nearer said bulb of smaller area than a contour cross-section farther from said bulb.

2. In a force dynamometer, a flexible and non-elastic pressure bulb, a pressure gage, said pressure gage being calibrated in force units, a pressure transmitting connection between said bulb and said gage, an essentially rigid pressure bulb carrier loosely encompassing said bulb except for a free area, a platen, said platen having a tapered form of cross-section, and means for guiding said platen for movement relative to said bulb with said tapered form against said free area thus contacting said pressure bulb with an increasing area of contact as motion progresses.

3. In a force dynamometer capable of fitting the human hand to measure the force of a grip, a flexible and non-elastic liquid-filled pressure bulb, a pressure gage connected to said bulb calibrated to read the magnitude of the force applied to said pressure bulb, a substantially rigid pressure bulb carrier encompassing said bulb except for a free area, a platen, said platen having a tapered form of cross-section, and substantially frictionless means for guiding said platen for movement relative to said bulb with said tapered form against said free area thus contacting said pressure bulb with an increasing area of contact as motion progresses, the unit pressure exerted on the liquid in said bulb bearing a predetermined relation with respect to the position of said platen.

4. In a myodynamometer adapted to fit the human hand to measure the force of a grip, a flexible non-stretching liquid-filled pressure bulb of elongated shape, an essentially rigid pressure bulb carrier encompassing said pressure bulb except for an elongated free area, a platen, said platen having a tapered form of cross-section, means for guiding said platen to move essentially parallel to itself and against the free area of said pressure bulb thus contacting said pressure bulb with an increasing area of contact as motion progresses, and a pressure gage connected to said pressure bulb, said pressure gage being calibrated to read the force applied by said platen to said bulb, the calibration showing greater sensitivity in the low force range and less sensitivity in the high force range.

5. A myodynamometer adapted to fit the fingers and palm of a human hand to measure the force exertable by human gripping muscles comprising: an elongated container having a pair of end walls, a rear wall, and a pair of side walls; a flexible and non-elastic liquid-filled pressure bulb disposed within said container, said bulb including a rear wall, a pair of side walls shorter in extent than the transverse dimentions of said container side walls, and a front wall deformable into the interior of said bulb at substantially constant bulb wall thickness and without stretching; an elongated cap having a back wall, and a pair of side walls normally spaced from said pair of container side walls in parallel relation and movable into abutment therewith to form a limit stop at a predetermined relative position of said cap rear wall and said container rear wall; a pair of crossed-links mounted on each of the corresponding adjacent side walls of said cap and said container whereby said cap and said container are constrained to move toward and away from each other in parallel fashion; an elongated platen mounted on said rear wall of said cap and extending toward said front wall of said pressure bulb, the portion of said platen adjacent said bulb being tapered whereby initial engagement of said platen and said front walls under small gripping force applied to said platen effects a relatively large inward deformation of said front wall and displacement of said liquid, and whereby increasing force applied to said platen causes an increasing area of contact between said platen and said bulb front wall and effects a relatively smaller inward deformation of said front wall and displacement of said liquid; and a pressure gage connected to said liquid in said bulb, said gage being calibrated in dependence upon the differential liquid displacement resulting from said taper on said platen, said gage having a terminal calibration substantially corresponding to the maximum desired pressure developed in said bulb and determined by the position of abutment between the adjacent edges of said cap side walls and said container side walls.

References Cited in the file of this patent

UNITED STATES PATENTS

| | | |
|---|---|---|
| 1,623,869 | Giraldi | Apr. 5, 1927 |
| 1,755,849 | Temple | Apr. 22, 1930 |
| 2,022,203 | Hughes | Nov. 26, 1935 |
| 2,132,862 | Pilates | Oct. 11, 1938 |
| 2,189,552 | Raphael | Feb. 6, 1940 |
| 2,392,702 | Saunders | Jan. 8, 1946 |
| 2,530,333 | Jost | Nov. 14, 1950 |
| 2,548,960 | Ekstrom | Apr. 17, 1951 |